Oct. 11, 1960 T. M. HERBERT 2,955,679
DISK BRAKE ASSEMBLY FOR RAILWAY CARS
Filed Aug. 1, 1958 4 Sheets-Sheet 1

INVENTOR
Thomas M. Herbert
BY Wm. R. Glisson
ATTORNEY

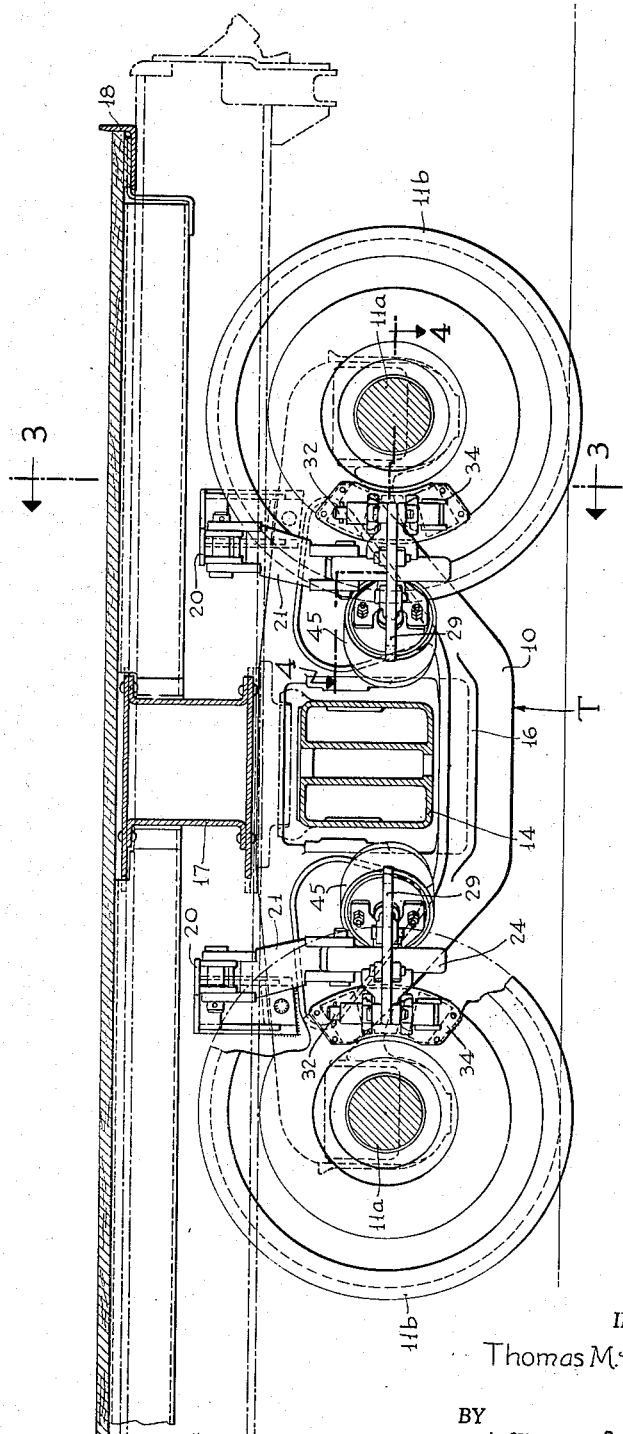

Oct. 11, 1960 T. M. HERBERT 2,955,679
DISK BRAKE ASSEMBLY FOR RAILWAY CARS
Filed Aug. 1, 1958 4 Sheets-Sheet 3
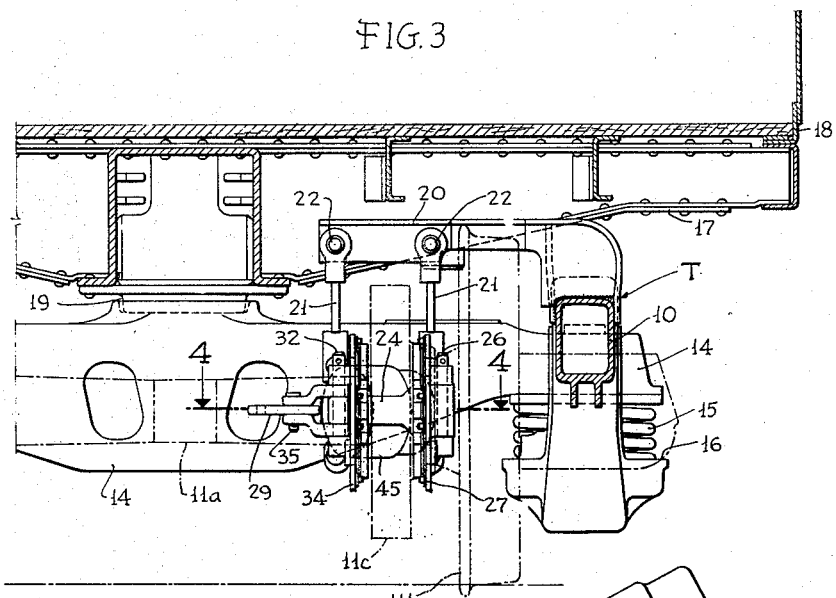
INVENTOR
Thomas M. Herbert
BY
Wm. R. Glisson
ATTORNEY INVENTOR
Thomas M. Herbert.
BY Wm R. Glisson
ATTORNEY 2,955,679
Patented Oct. 11, 1960

United States Patent Office

2,955,679
DISK BRAKE ASSEMBLY FOR RAILWAY CARS

Thomas M. Herbert, Huntingdon Valley, Pa., assignor to The Budd Company, Philadelphia, Pa., a corporation of Pennsylvania Filed Aug. 1, 1958, Ser. No. 752,589

3 Claims. (Cl. 188—59)

This invention relates to a disk brake assembly for railway cars and has for an object the provision of improvements in this art.

One of the particular objects is to provide a disk brake assembly for railway cars which will accommodate wide end play of the wheel-axle unit while maintaining the braking action unimpaired.

Another object is to provide a disk brake assembly which is mounted on the truck frame.

Another object is to provide a brake assembly which is relatively simple and inexpensive to manufacture and easy to install and maintain.

The above and other objects and various advantages of the invention will be apparent from the following description of an exemplary embodiment, reference being made to the accompanying drawings thereof, wherein:

Fig. 2 is a vertical longitudinal section taken on the line 2—2 of Fig. 1;

Fig. 3 is a partial vertical transverse section taken on the line 3—3 of Figs. 1 and 2;

Fig. 4 is a partial enlarged horizontal plan and section taken about on the line 4—4 of Figs. 2 and 3;

Fig. 5 is a partial vertical elevation and section taken on the line 5—5 of Fig. 4;

Figure 1:
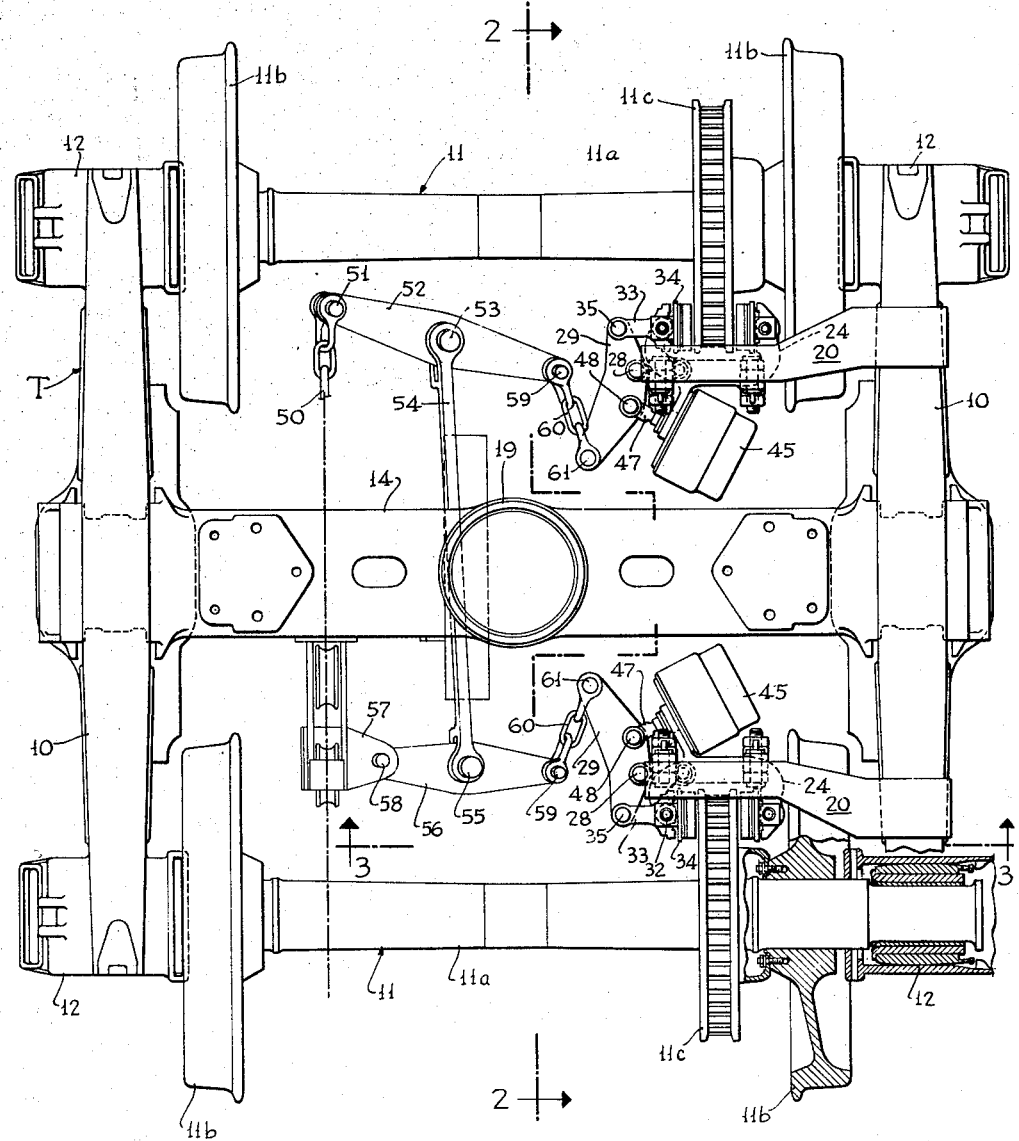
Fig. 1 is a top plan view of a railway car truck provided with brake assemblies embodying the present invention.
Figure 6:
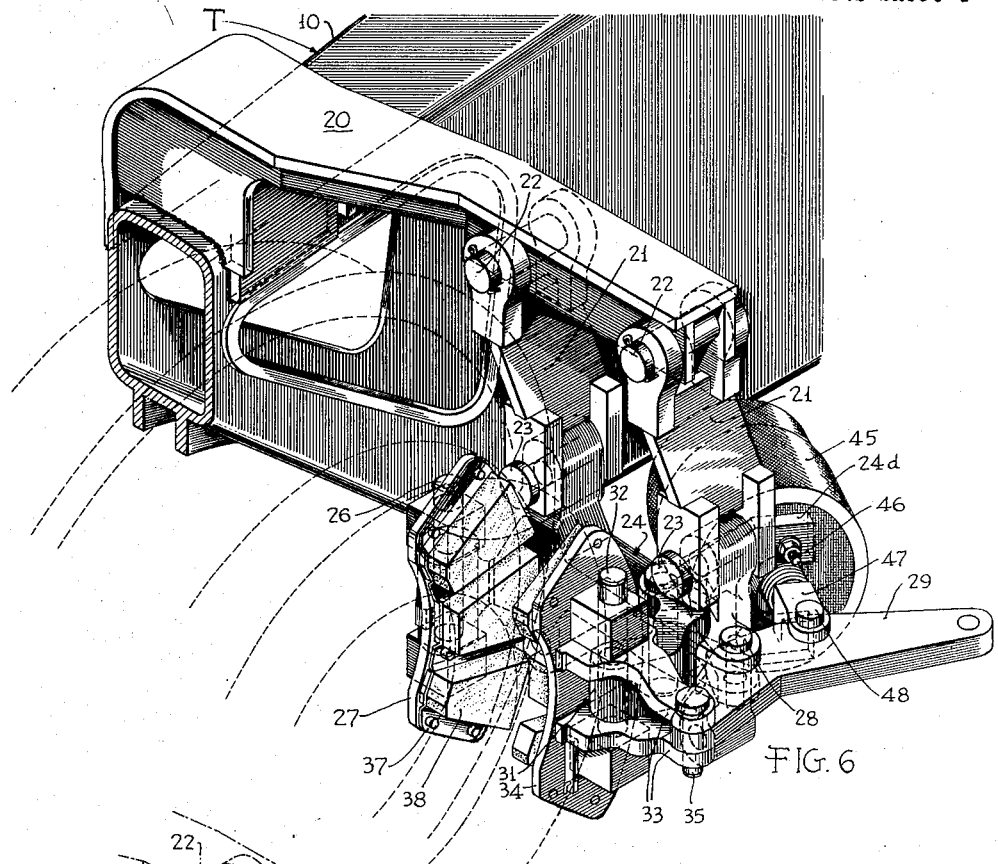
Fig. 6 is an isometric view of the brake mechanism assembly alone.

As shown in the drawings, the truck T comprises side frame members 10 carried by two wheel-axle units 11 at sliding universal bearing joints 12, one of which is shown in section in Fig. 1. Each wheel-axle unit 11 comprises a rigid axle 11a carrying fast thereon spaced flanged wheels 11b. Each wheel-axle unit also carries a ventilated brake disk 11c, here shown in Fig. 1 as being secured to the hub of one of the wheels.

A bolster 14 is carried by the side frames, supported by springs 15 at each end, the springs resting in seats 16 formed in the lower portion of the side frames; as shown particularly in Fig. 3.

A body bolster 17 of a car body 18 is carried on a turnable center joint 19 on the bolster. The ends of the bolster project through suitable openings in the side frames and the spring seats are formed in a dropped portion of the side frames well below the height of the axle bearings for stability and low carriage.

The brake assembly unit, with which the present invention is particularly concerned, is carried by an inwardly projecting bracket or stub cantilever beam 20 rigidly secured to a side frame in any suitable way, as by welding or otherwise.

Figure 7:
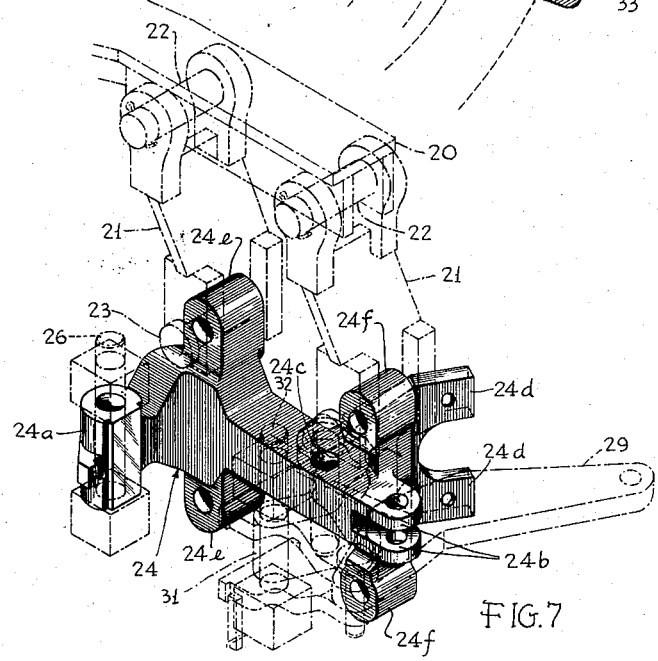
Fig. 7 is an isometric view of a base element or platform alone.
Figure 8:
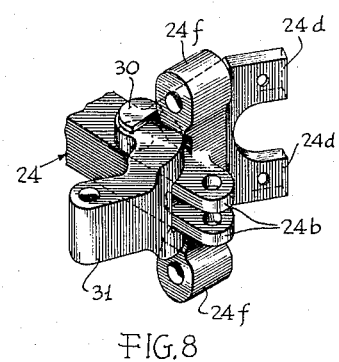
Fig. 8 is an isometric view of the end of the base element or platform with a related lever mechanism.

The brake assembly is suspended from the stub beam 20 by a pair of parallel pantograph bars 21 pivoted by pins 22 at their upper end to the stub beam and at their lower end being provided with pivot pins 23 which swingably support a base frame or platform 24. This base frame or platform in the present embodiment has a somewhat irregular form and is shown separately in Figs. 7 and 8 for clarity.

The base or platform is generally L-shaped in plan with the base of the L disposed on the outboard side and turned back inward where it is provided with a vertical enlargement 24a carrying a pivot pin 26 on which is mounted an outboard brake shoe support or backing plate 27.

On the inboard portion the platform is provided with vertically spaced end projections 24b carrying a pivot pin 28 which supports a brake lever 29. Intermediately the platform is provided with a vertical hole 24c carrying a pivot pin 30 to which the bifurcated end of a second brake shoe lever 31 is pivotally connected. At its other end the lever 31 is pivotally connected by a pin 32 to links 33. The pin 32 also pivotally supports a second brake shoe backing plate 34. The outer end of the links 33 are pivotally connected to the end of the main brake lever 29 by a pivot pin 35. The pins 28 and 35 of the main brake lever 29 and the pins 30 and 32 of the secondary brake shoe lever 31 are located at the corners of a parallelogram and the lever 31 and the end of lever 29 form a pantograph for keeping the outer brake shoe plate 34 in proper alignment.

As shown in Fig. 4, the brake shoe backing plates 27 and 34 have their pivotal movement on their mounting pins 26 and 32, respectively, limited by stops 36 formed respectively on the L-shaped platform 24 and the links 33. Brake shoes 37 carrying brake lining segments 38 are removably secured to the brake shoe backing plates 27 and 34 in any convenient manner and the shoe plate is backed at the backing plate by resilient pads 39, as of rubber. Alignment of the brake shoe backing plates is provided by the arrangement of the platform and related parts and the disposition of the link 33.

Power means are provided for operating the brakes, the means here shown comprising a power cylinder 45 secured by bolts 46 to the spaced projections 24d of the platform 24. A piston rod 47 of the power device is connected by a pivot pin 48 to the main brake operating lever 29.

It will be noted that the platform 24 is symmetrical about a central horizontal plane therethrough so as to be reversible for opposite assemblies by turning it upside down. Its projections or lugs 24e and 24f for pivot pins 23 of the swing hanger bars 21 are placed on both sides of the stem of the L-shaped platfrom but only one set is used at one time for a given assembly.

As shown in Fig. 1, hand brake operation is provided by a linkage from a cable or chain 50 which is pivoted by a pin 51 to one end of a floating link 52. Intermediate its ends the floating link 52 is pivoted by a pin 53 to a rigid bar 54 which at its other end is pivoted by a pin 55 to the mid-portion of a second link 56 which is pivoted to a fixed bracket 57 by a pin 58. At their other ends the links 52 and 56 are connected each by a pivot pin 59 to a chain 60 which, in turn, is connected by a pivot pin 61 to the outer end of the main brake lever 29 for each of the two brake operating assemblies on the truck.

In operation, the platform 24 swings on the pantograph bars 21 as the wheel-axle unit and brake disk move axially, the parallelogram motion keeping the platform level at all times. The brake lever pantograph arrangement keeps the inboard brake shoe plate parallel with the disk surfaces and other brake shoe plate at all times, the brake shoe plates at the same time having a limited amount of turning movement about their mounting pivot pins. The operation of the hand brake arrangement is obvious from a consideration of the mechanism as described.

It is thus seen that the invention provides a simple, rugged, inexpensive and dependable brake mechanism which follows the movements of the wheel axle unit while keeping the shoes properly aligned at all times. The mechanism is also easy to install and service.

While one embodiment of the invention has been described for purposes of illustration, it is to be understood that there may be various embodiments and modifications within the general scope of the invention.

What is claimed is:

1. A disk brake assembly for a railway car truck, comprising in combination, longitudinally spaced wheel-axle units, a truck frame mounted on said wheel-axle units, a brake rotor secured on a wheel axle unit, transversely spaced vertical links suspended at their upper ends from the truck frame on transversely spaced pivot pins having longitudinally extending axes on opposite sides of the brake disk, a horizontal platform suspended by said vertical links on pivot pins having longitudinally extending axes on opposite sides of the brake disk, said pivoted links and said platform pivoted on the links together forming a pantograph which provides transverse swinging movement of the platform on a line parallel to the axis of the axle of the wheel-axle unit, brake shoes mounted on said platform, one of the brake shoes being mounted on a part having transverse movement on the platform so as to grip the brake disk between the shoes, and means carried by said platform for moving said shoes relative to each other to grip the brake disk, the platform swinging as necessary to enable the brake shoes to follow the brake disk and the braking reaction being taken vertically through said vertical links.

2. A disk brake assembly for railway car trucks as set forth in claim 1, further characterized by the fact that one of said brake shoes is mounted on a pantograph mounted on said platform and having pivot pins with vertical axes spaced apart transversely and longitudinally.

3. A disk brake assembly as set forth in claim 1, further characterized by the fact that one of said brake shoes is mounted to turn on a pivot pin having a vertical axis, a horizontal link spaced longitudinally from said platform, a pair of transversely spaced pantograph arms mounted on transversely spaced vertical pivot pins carried by said platform, said horizontal link being connected to the ends of said arms by transversely spaced vertical pivot pins, the arms and the horizontal link forming a horizontally swinging pantograph carrying the pivoted brake shoe, a power lever arm extension on one of said arms extending past the back side of said platform, and power means carried by a support on the back side of said platform for operating said power lever arm.

References Cited in the file of this patent

UNITED STATES PATENTS

| | | |
|---|---|---|
| 2,527,072 | Pogue | Oct. 24, 1950 |
| 2,702,097 | Tack et al. | Feb. 15, 1955 |
| 2,713,400 | Coskun | July 19, 1955 |
| 2,781,106 | Lucien | Feb. 12, 1957 |
| 2,859,838 | Tack et al. | Nov. 11, 1958 |

FOREIGN PATENTS

| | | |
|---|---|---|
| 1,129,639 | France | Sept. 10, 1956 |
| 730,053 | Great Britain | May 18, 1955 |